No. 700,047. Patented May 13, 1902.
P. HOFMANN.
GRAIN THRESHING MACHINE.
(Application filed June 28, 1901.)
(No Model.)

Witnesses: Inventor: Peter Hofmann,
By Thomas G. Orwig, Attorney.

UNITED STATES PATENT OFFICE.

PETER HOFMANN, OF GREENFIELD, IOWA.

GRAIN-THRESHING MACHINE.

SPECIFICATION forming part of Letters Patent No. 700,047, dated May 13, 1902.

Application filed June 28, 1901. Serial No. 66,323. (No model.)

*To all whom it may concern:*

Be it known that I, PETER HOFMANN, a citizen of the United States, residing at Greenfield, in the county of Adair and State of Iowa, have invented a new and useful Improvement in Threshing-Machines, of which the following is a specification.

My object is to facilitate the separation of grain from the straw after it is passed through between the cylinder and the concave and also to elevate the straw from the shaker and advance the straw rapidly toward the straw-carrier as required to prevent clogging in rear of the concave and to separate the grain from the straw immediately in rear of the concave.

My invention consists in the arrangement and combination of an auxiliary straw-carrier with a shaker, a concave, and two endless straw-carriers, as hereinafter set forth, pointed out in my claim, and illustrated in the accompanying drawings, in which—

Figure 1:
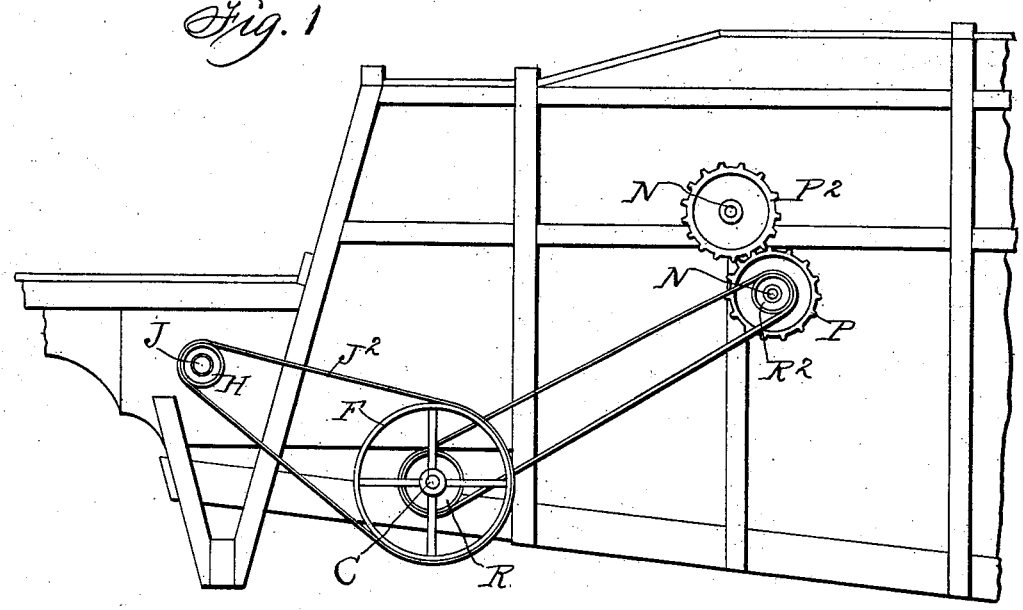
Figure 2:
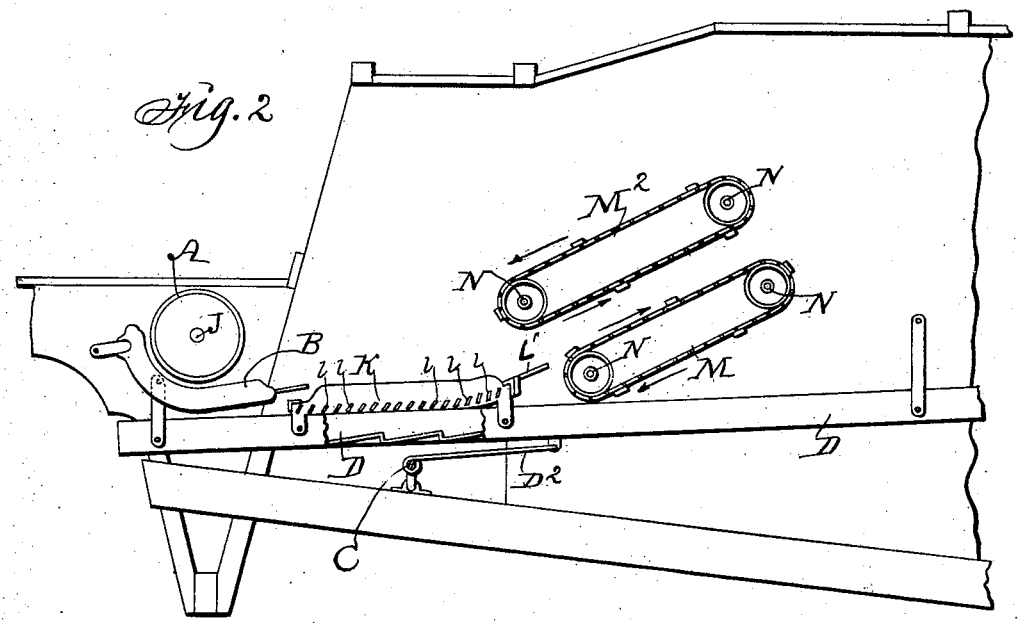

Figure 1 is a side elevation of the front portion of a thresher, showing how motion is transmitted from the cylinder to the shaker carrying the auxiliary straw-carrier and also to the two endless straw carriers and elevators. Fig. 2 is a vertical and longitudinal sectional view showing the positions of the shaker, the auxiliary straw-carrier, and the two endless straw-carriers relative to each other, and the concave and cylinder.

The letter A designates the cylinder, and B the concave under the cylinder.

D is the shaker, suspended between the parallel walls of the thresher and connected with a crank-shaft C by means of a link $D^2$ in such a manner that when the shaft is rotated the shaker will be vibrated as required to move grain that falls thereon rearward.

F is a belt-wheel on the end of the shaft C, connected with a pulley H on the end of the axle J of the cylinder by means of a belt $J^2$ or in any suitable way as required to transmit motion from the cylinder to the shaker. A fixed pulley (not shown) on the other end of the cylinder-shaft J is connected with an engine in a common way as required to operate the cylinder and the separator mechanism connected therewith.

K is an auxiliary straw-carrier, consisting of a frame and a plurality of cross-slats $l$, fixed to the parallel sides of the frame and preferably inclined, as shown. A fixed extension or table $l'$ at the rear end of the auxiliary carrier K serves as a bridge for conveying straw from the auxiliary carrier to endless carriers.

M and $M^2$ are endless carriers mounted upon rotatable shafts N, journaled to the sides of the thresher-frame in such positions relative to each other that they will coact with the auxiliary carrier K in moving straw and separating grain therefrom, so the grain will fall on the shaker D. Pulleys R and $R^2$ and a belt S on said pulleys connect the endless carriers M and $M^2$ with the shaft C as required for operating the said carriers in concert with the shaker D and auxiliary carrier K for separating the grain from the straw and elevating and moving the straw rearward in a plane above the shaker D.

It is obvious that the grain that drops from the straw while the straw is passing rearward over the auxiliary straw-carrier K will fall upon the shaker D. It is also obvious that as the straw is advanced rearward and upward between the two endless carriers M and $M^2$ that grain dropping therefrom will also fall upon the shaker K to be thereby carried rearward to fall upon screens or riddles to be subjected to the action of a fan in a common way.

Having thus described the purpose of my invention and the construction, arrangement, and combination of the coöperative parts its practical operation and utility will be readily understood by persons familiar with the art to which it pertains.

What I claim as new, and desire to secure by Letters Patent, is—

A shaker suspended under the cylinder and concave and extended rearwardly, an auxiliary straw-carrier adapted to let grain fall therethrough fixed on top of the shaker in rear of the concave, an extension at the rear of the said carrier adapted to serve as a bridge between the auxiliary shaker and the two parallel endless and coacting straw-carriers, two endless carriers in parallel upwardly-inclined planes in rear of the auxiliary carrier on the shaker and means for simultaneously actuating the shaker and the endless carriers in concert with the cylinder, arranged and combined to operate in the manner set forth for the purposes stated.

PETER HOFMANN.

Witnesses:
W. A. EASTON,
H. A. SMITH.